United States Patent [19]

White et al.

[11] Patent Number: 5,314,670

[45] Date of Patent: May 24, 1994

[54] RECOVERY OF RHODIUM VALUES

[75] Inventors: Weimar W. White, Canaseraga; Gary G. Kiehl, Hilton, both of N.Y.

[73] Assignee: Eastman Kodak Company, Rochester, N.Y.

[21] Appl. No.: 778,122

[22] PCT Filed: Oct. 30, 1991

[86] PCT No.: PCT/US91/07979

§ 371 Date: Oct. 30, 1991

§ 102(e) Date: Oct. 30, 1991

[87] PCT Pub. No.: WO93/09063

PCT Pub. Date: May 13, 1993

[51] Int. Cl.$^5$ ............... C01G 55/00; C22B 11/00; C01B 9/00
[52] U.S. Cl. ............................ 423/22; 423/463
[58] Field of Search .............. 423/22, 463; 430/605

[56] References Cited

U.S. PATENT DOCUMENTS

| | | | |
|---|---|---|---|
| 2,448,060 | 9/1948 | Smith et al. | 430/605 |
| 2,566,245 | 8/1951 | Trivelli et al. | 430/608 |
| 2,566,263 | 8/1951 | Trivelli et al. | 430/608 |
| 2,875,040 | 2/1959 | Barabas | 423/22 |
| 3,024,084 | 3/1962 | Raper et al. | 423/463 |
| 3,531,289 | 9/1970 | Wood | 430/605 |
| 4,477,561 | 10/1984 | Menjo et al. | 430/605 |
| 4,857,450 | 8/1989 | Burrows et al. | 430/605 |

FOREIGN PATENT DOCUMENTS

| | | | |
|---|---|---|---|
| 134725 | 10/1949 | Australia. | |
| 489791 | 1/1953 | Canada | 430/605 |
| 2226877 | 6/1972 | Fed. Rep. of Germany. | |
| 59-171947 | 3/1983 | Japan. | |

OTHER PUBLICATIONS

Thomas, C. K., et al, "The Crystal ... Cesium Aquopentachlororhodate (III)," J. Coord. Chem. 2, 1973, pp. 231-234.

Kuhr, W. et al, "Preparation ... cesium trans-aqua-bromotetrachlororhodate(2-)," Z. Anorg. Allg. Chem., 1990, 581, pp. 153-158.

Fergusson, J. E., "Structural and Spectral ... rhodium (III)," Aust. J. Chem., 30(7), 1977, pp. 1445-1460.

Prokofeva, I. V. et al, "Behavior of Ammonium ... Pentachloroaquorhodates When They Are Heated," Sov. J. Coor. Chem., 4(1), 1978, pp. 24-26.

Primary Examiner—Michael Lewis
Assistant Examiner—Steven Bos
Attorney, Agent, or Firm—David F. Janci

[57] ABSTRACT

Ammonium pentachloromonoaquorhodate(III), $(NH_4)_2RhCl_5(H_2O)$, is a useful photographic chemical. Small amounts of rhodium-containing, water soluble species remain in solution in the process liquor after synthesis. Most of the soluble rhodium values are present as the aforementioned ammonium complex; however there are traces of the cis and trans isomers of ammonium tetrachlorodiaquorhodate(III), and traces of the fac and/or mer isomers of rhodium(III) chloride triaquo complexes. Rhodium values present in the liquid as ammonium pentachloromonoaquorhodate(III) can be recovered by the addition of cesium chloride to form a precipitate identified as $Cs_2RhCl_5(H_2O)$. Very little of the aforementioned fac and mer isomers or other contaminants, if any, are contained in the precipitate. The cesium rhodium pentachloride monohydrate product can be refined, for recovery of rhodium values, or used as an additive to a silver halide emulsion to control fog or stabilize the emulsion.

2 Claims, No Drawings

RECOVERY OF RHODIUM VALUES

TECHNICAL FIELD

This invention relates to rhodium chemistry. More particularly, it relates to the recovery of soluble rhodium values from process liquors used in the preparation of a compound employed in photographic chemistry. The rhodium values are recovered as a substantially insoluble precipitate which can be used as an additive to silver halide emulsions.

BACKGROUND ART

Ammonium pentachloromonoaquorhodate(III) is useful in photographic chemistry. A small amount of rhodium as a soluble species remain in solution after synthesis. Most of the soluble rhodium values are present as the aforementioned ammonium complex; however there are traces of the cis and trans isomers of ammonium tetrachlorodiaquorhodate(III), and traces of the fac and/or mer isomers of rhodium(III) chloride triaquo complexes are present in the process liquors from which the ammonium pentachloromonoaquorhodate(III) is precipitated.

Rhodium compounds are expensive: and therefore, recovery rather than discharge in an effluent, is desired. Furthermore, recovery is also desirable from an environmental viewpoint. Therefore, need exists for a method to conveniently recover rhodium values from the process liquor. This invention satisfies that need.

The following references disclose the $Cs_2RhCl_5(H_2O)$ product produced by the process of this invention: Ferguson et al., *Australian J. Chem.*, No. 7, 30, (July 1977), pp. 1445-1460, Thomas et al., *J. Coord. Chem.* 1973, 2 pp. 231-234, Prokofersa et al., *Koord. Khim.*, 4, No. 1, (1978), pp.32-34. These references do not disclose the process of the invention.

U.S. Pat. No. 3,531,289 discloses a use of ammonium hexachlororhodate. Also U.S. Pat. Nos. 2,448,060, 2,566,245, 2,566,263, 4,477,561, 4,857,450; Australian 134,725; German Offen. 2,226,877; and Japan 59/171,947 relate to uses of alkali metal rhodium compounds in photographic emulsions.

DISCLOSURE OF INVENTION

In one aspect, this invention relates to a process for the preparation of $Cs_2RhCl_5(H_2O)$ said process comprising reacting cesium chloride with $(NH_4)_2RhCl_5(H_2O)$ in an aqueous reaction mixture having about 80 percent ethanol, and sufficient HCl to make the content of acid in the aqueous portionins 4-5N. In a preferred embodiment of this invention, the process is carried out in an acidic; organic-aqueous solution in which the $(NH_4)_2RhCl_5(H_2O)$ is present together with traces of the cis and trans isomers of ammonium tetrachlorodiaquorhodate(III) and traces of the fac and/or mer isomers of rhodium(III) chloride triaquo complexes. An aqueous material of such a composition can be prepared by the reaction of ammonium chloride, HCl and rhodium (III) chloride, and removal of the $(NH_4)_2RhCl_5(H_2O)$, which precipitates from the alcohol water mixture used as a reaction solvent.

In another aspect, this invention provides a silver halide emulsion containing from about 0.5 to about 50 mg of $Cs_2RhCl_5(H_2O)$ per each 100 grams of silver in the emulsion.

The dual function of the $Cs_2RhCl_5(H_2O)$ i.e., a means of recovery of rhodium values, and an additive for silver halide emulsions was unexpected, and makes this invention readily adaptable by industry.

BEST MODE FOR CARRYING OUT THE INVENTION

The process of this invention, for the preparation of $Cs_2RhCl_5(H_2O)$ by the reaction of cesium chloride, can be conducted by reacting two moles of the cesium compound per each one mole portion of $(NH_4)_2RhCl_5(H_2O)$. However, it is not necessary to use stoichiometric quantities, and non stoichiometric properties can be used. Thus an excess of either reactant can be used, if desired. For example, an excess of the cesium compound can be use to help drive the reaction to completion, and/or aid in the precipitation of the product cesium/rhodium complex. The amount of excess is not a critical part of this invention, and it is governed by such secondary considerations as process economics. In general from about 2 to about 2.2 moles of the cesium reactant are employed for each one mole portion of $(NH_4)_2RhCl_5(H_2O)$.

The process proceeds well at ambient temperature, but higher and lower temperatures can be employed. For example it can be conducted at any temperature from the freezing to the boiling point of the organic-/aqueous phase in which the reaction is carried out. A preferred temperature range is from about 15° to about 35° C.

The process proceeds well at ambient pressure, however greater and lesser pressures can be used if desired. In general, the use of subatmospheric pressures may not contribute any material advantage; and therefore such pressures are generally not preferred. Superatmospheric pressures can be used if there is a desire to conduct the reaction above the normal boiling point of a liquid present in the reaction mixture, or if it is desired to retard the escape to the atmosphere of a volatile material present in the reaction mixture.

As indicated above, the process is preferably conducted in the presence of an alcohol-aqueous reaction mixture. The alcohol/aqueous phase may be admixed with other ingredients that do not materially interfere with the process, such as a water miscible solvent commonly used in the preparation of products for the photographic industry. Thus for example, the process can be conducted in the presence of alcohol water mixtures containing acetone, or methylene chloride, or a mixture of such substances.

The process of this invention is conducted in the presence of a reaction mixture containing from about 80 to about 90 volume percent of an alcohol such as ethanol, in water solvent. It will be recognized by a skilled practitioner that although the process of this invention can be conducted in the presence of a liquid system having more than one phase; multiphase systems are not preferred since they can complicate recovery procedures and unnessesarily add to process costs.

At various parts of this Specification, it is stated that the process of this invention comprises the reaction of cesium chloride with $(NH_4)_2RhCl_5(H_2O)$. It is recognized that the starting material may not exist in hydrated form when in solution. However, the process is described using the hydrated form to indicate that the process is preferentially carried out by the addition of cesium chloride to a reaction liquor from which $(NH_4)_2RhCl_5(H_2O)$ has precipitated, and a portion remains soluble in the reaction liquor.

It is to be recognized by a skilled practitioner that a solution containing $(NH_4)_2RhCl_5(H_2O)$ or a material in solution that results in precipitation of the hydrate, can be added to a solution of cesium chloride. In other words, the process of this invention is not dependent upon the mode or order of addition.

In the process of this invention, cesium chloride is used as a precipitant. It has the requisite solubility in the alcohol/water phase whereas, KCl does not. The process produces product substantially free of materials such as $Cs_3RhCl_6$. Thus, the product is substantially pure; and therefore can be employed without appreciable purification. This feature of the invention was unexpected.

The reaction of this invention is comparatively rapid, and generally essentially complete within one hour or less. The product mixture can be allowed to stand for a longer period of time, if it deemed desirous to do so. Thus for example, the reaction mixture of this invention can be allowed to stand for 24–48 hours or more, to ripen the precipitate, if desired.

When ammonium pentachloromonoaquorhodate (III) is prepared from ammonium chloride and rhodium (III) chloride in an acidic (4–5N HCl) aqueous reaction mixture having 80% by volume ethanol, the product yield is about 95.6%. As stated above, the rhodium species left in solution is largely dissolved $(NH_4)_2RhCl_5(H_2O)$. The following example illustrates the process of this invention.

EXAMPLE

Recovery Method for Rhodium from an $(NH_4)_2RhCl_5(H_2O)$ Process Liquor

I. To each gallon of process liquor containing between 0.090 mg and 0.269 mg of rhodium as the chlorocomplex mentioned above, add 4.0 grams of cesium chloride which has been dissolved in 10 ml of water. Stir the suspension for approximately 5 minutes to coagulate the particles produced, and allow the precipitate to settle overnight.

Note: The composition of the rhodium process liquor comprises, 20% by volume aqueous (4.0 to 5.0N HCl) and 80% by volume ethanol.

II. Discard the clear liquid by decantation or pump. Suction filter the residual solid material onto a medium porosity glass filter funnel.

III. Place the funnel in the oven at 100° C. and dry to constant weight.

IV. Transfer the dried material to a polyethylene bottle for storage.

Equation

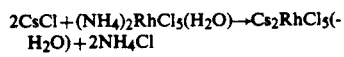

$$2CsCl + (NH_4)_2RhCl_5(H_2O) \rightarrow Cs_2RhCl_5(H_2O) + 2NH_4Cl$$

RESULTS AND DISCUSSION

X-Ray diffraction analysis has identified the rhodium recovery material as mostly $Cs_2RhCl_5(H_2O)$. Table I shows the component analysis of the cesium rhodium precipitate. The results are a reasonable approximation of what was expected from a theoretical calculation of the ideal compound. A variety of analytical techniques were used to determine the composition of the material.

Five different waste effluents were treated with the cesium chloride as described. Table II shows the quantities of $Cs_2RhCl_5(H_2O)$ collected in g/gal, along with the calculated percent recovery and the amounts of rhodium remaining in solution after filtration. Approximately 90% of the rhodium as an average is removed from the waste stream by the addition of CsCl.

TABLE I

| Analysis of $Cs_2RhCl_5(H_2O)$ Precipitate | | |
|---|---|---|
| Element | Found, % | Theoretical Composition of $Cs_2RhCl_5(H_2O)$, % |
| $Cs^{(a)}$ | 46.1 | 47.1 |
| $Rh^{(b)}$ | 18.8 | 18.2 |
| $Cl^{(a)}$ | 30.8 | 31.4 |
| $H_2O^{(b)}$ | 2.8 | 3.2 |

$^{(a)}$ = neutron activation analytical results
$^{(b)}$ = thermal gravimetric analytical results

TABLE II

| | Recovery of Rhodium from Waste Effluent | | |
|---|---|---|---|
| Cases | Solids Collected, g/gal | Recovery, % | Rh not recovered mg/ml |
| 1 | 3.7 | 95.3 | 0.015 |
| 2 | 5.0 | 73.4 | 0.084 |
| 3 | 5.6 | 94.5 | 0.020 |
| 4 | 5.2 | 89.2 | 0.034 |
| 5 | 2.7 | 97.2 | 0.011 |

The silver halide emulsion for use in the photographic material of the present invention may be any of the silver halide emulsions that are conventionally used in the art, containing silver chloride, silver bromide, silver iodobromide, silver chlorobromide, silver chloroiodine and chloroiodobromide crystals, as well as mixtures thereof. The silver halide emulsion may be made of large or small grains, and it may be of a mono- or polydispersed system. The silver halide crystals may be cubic, octahedral or mixed epitaxial crystals or the like. The emulsion may be of negative type or direct positive type. It is a surface latent image type emulsion wherein a latent image is formed primarily on the surface of silver halide grians, or an internal latent image type emulsion wherein the latent image is primarily formed in the interior of the silver halide grains.

It is specifically contemplated to employ thin and high aspect ratio tabular grain silver halide emulsions as host grain emulsions. Such emulsions are illustrated by Wilgus et al U.S. Pat. No. 4,434,226; Kofron et al U.S. Pat. No. 4,439,520; Daubendiek et al U.S. Pat. No. 4,414,310; Abbott et al U.S. Pat. Nos. 4,425,425 and '426; Wey U.S. Pat. No. 4,399,215; Solberg et al U.S. Pat. No. 4,433,048; Dickerson U.S. Pat. No. 4,414,304; Mignot U.S. Pat. No. 4,386,156, Mignot *Research Disclosure*, Vol. 232, August 1983, Item 23210; Jones et al U.S. Pat. No. 4,478,929; Evans et al U.S. Pat. No. 3,761,276; Maskasky U.S. Pat. No. 4,400,463; Wey et al U.S. Pat. No. 4,414,306; and Maskasky U.S. Pat. No. 4,435,501, cited above and here incorporated by reference.

As herein defined high aspect ratio tabular grain emulsions are those comprised of a dispersing medium and silver halide grains, wherein at least 50 percent of the total projected area of the silver halide grains is provided by tabular silver halide grains having a thickness of less than 0.3 mm, a diameter of at least 0.6 mm, and an average aspect ratio of greater than 8:1. In some applications, such as in recording radiation within a portion of the spectrum that the silver halide is capable of absorbing, at least 50 percent of the total projected area of the total projected area of the silver halide grains is provided by tabular silver halide grains having a thickness of less than 0.5 mm, a diameter of at least 0.6 mm, and an average aspect ratio of greater than 8:1. Preferred high aspect ratio tabular grain emulsions are those in which the average aspect ratio is at least 12:1 and optimally at least 20:1. It is also preferred to increase the projected area referred to above from 50 percent to 70 percent and optimally to 90 percent. Silver bromoiodide emulsions are generally preferred for camera speed imaging applications while silver bromide and silver bromoiodide emulsions are preferred for radiographic imaging.

As herein defined thin tabular grain emulsions are those comprised of a dispersing medium and silver halide grains, wherein at least 50 percent of the total projected area of the silver halide grains is provided by tabular silver halide grains having a thickness of less than 0.2 mm and an average aspect ratio of greater than 5:1. The preferences noted above for high aspect ratio emulsions apply also to thin tabular grain emulsions. Emulsions which satisfy both definitions are preferred for most photographic applications.

The radiation sensitive silver halide emulsions and the photographic elements in which they are incorporated of this invention can take any convenient conventional form. The emulsions can be washed as described in *Research Disclosure*, Item 17643, cited above, Section II.

The radiation sensitive silver halide grains of the emulsions can be surface chemically sensitized. Noble metal (e.g., gold), middle chalcogen (e.g., sulfur, selenium, or tellurium), and reduction sensitizers, employed individually or in combination are specifically contemplated.

Typical chemical sensitizers are listed in *Research Disclosure*, Item 17643, cited above, Section III.

The silver halide emulsions can be spectrally sensitized with dyes from a variety of classes, including the polymethine dye class, which includes the cyanines, merocyanines, complex cyanines and merocyanines (i.e., tri-, tetra-, and polynuclear cyanines and merocyanines), oxonols, hemioxonols, styryls, merostyryls, and streptocyanines. Illustrative spectral sensitizing dyes are disclosed in *Research Disclosure*, Item 17643, cited above. Section IV.

The silver halide emulsions as well as other layers of the photographic elements of this invention can contain as vehicles hydrophilic colloids, employed alone or in combination with other polymeric materials (e.g., latices). Suitable hydrophilic materials include both naturally occurring substances such as proteins, protein derivatives, cellulose derivatives—e.g., cellulose esters, gelatin—e.g., alkali treated gelatin (cattle, bone, or hide gelatin) or acid treated gelatin (pigskin gelatin), gelatin derivatives—e.g., acetylated gelatin, phthalated gelatin, and the like, polysaccharides such as dextran, gum arabic, zein, casein, pectin, collagen derivatives, collodion, agar-agar, arrow-root, and albumin. The vehicles can be hardened by conventional procedures. Further details of the vehicles and hardeners are provided in *Research Disclosure*, Item 17643, cited above, Sections IX and X.

The silver halide photographic elements of this invention can contain other addenda conventional in the photographic art. Useful addenda are described, for example, in *Research Disclosure*, Item 17643, cited above. Other conventional useful addenda include antifoggants and stabilizers, couplers (such as dye forming couplers, masking couplers and DIR couplers) DIR compounds, anti-stain agents, image dye stabilizers, absorbing materials such as filter dyes and UV absorbers, light scattering materials, antistatic agents, coating aids, and plasticizers and lubricants.

The photographic elements of the present invention can be simple black-and-white or monochrome elements comprising a support bearing a layer of the silver halide emulsion, or they can be multilayer and/or multicolor elements. The photographic elements produce images ranging from low contrast to very high contrast, such as those employed for producing half tone images in graphic arts. They can be designed for processing with separate solutions or for in-camera processing. In the latter instance the photographic elements can include conventional image transfer features, such as those illustrated by *Research Disclosure*, Item 17643, cited above, Section XXIII. Multicolor elements contain dye image forming units sensitive to each of the three primary regions of the spectrum. Each unit can be comprised of a single emulsion layer or of multiple emulsion layers sensitive to a given region of the spectrum. The layers of the element, including the layers of the image forming units, can be arranged in various orders as known in the art. In an alternative format, the emulsion or emulsions can be disposed as one or more segmented layers, e.g., as by the use of microvessels or microcells, as described in Whitmore U.S. Pat. No. 4,387,154.

A preferred multicolor photographic element according to this invention containing incorporated dye image providing materials comprises a support bearing at least one blue sensitive silver halide emulsion layer having associated therewith a yellow dye forming coupler, at least one green sensitive silver halide emulsion layer having associated therewith a magenta dye forming coupler, and at least one red sensitive silver halide emulsion layer having associated therewith a cyan dye forming coupler, at least one of the silver halide emulsion layers containing grains having ruffled faces as previously described.

The elements of the present invention can contain additional layers conventional in photographic elements, such as overcoat layers, spacer layers, filter layers, antihalation layers, and scavenger layers. The support can be any suitable support used with photographic elements. Typical supports include polymeric films, paper (including polymer-coated paper), glass, and metal supports. Details regarding supports and other layers of the photographic elements of this invention are contained in *Research Disclosure*, Item 17643, cited above, Section XVII.

The photographic elements can be imagewise exposed with various forms of energy, which encompass the ultraviolet, visible, and infrared regions of the electromagnetic spectrum as well as electron beam and beta radiation, gamma ray, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements, such as those illustrated by Research Disclosure, Vol. 184, August 1979, Item 18431.

Processing of the imagewise exposed photographic elements can be accomplished in any convenient conventional manner. Processing procedures, developing agents, and development modifiers are illustrated by

*Research Disclosure*, Item 17643, cited above, Sections XIX, XX, and XXI, respectively.

This invention has been described with particular reference to preferred embodiments thereof. A skilled practitioner, familiar with the above detailed description, can make substitutions or modifications without departing from the scope and spirit of the claims below.

We claim:

1. A process for the formation of $Cs_2RhCl_5(H_2O)$, said process comprising reacting cesium chloride with $(NH_4)_2RhCl_5(H_2O)$ in an aqueous reaction mixture having about 80 percent ethanol, and sufficient HCl to make the content of acid in the aqueous portion of said reaction mixture, 4–5N.

2. A process for the recovery of rhodium values from a process liquor effluent containing dissolved $(NH_4)_2RhCl_5(H_2O)$, $(NH_4Cl)RhCl_4(H_2O_2$ and $RhCl_3$, said process comprising reacting said $(NH_4)_2RhCl_5(H_2O)$ in said liquor with cesium chloride to precipitate $Cs_2RhCl_5(H_2O)$, and separating said $Cs_2RhCl_5(H_2O)$ from the thereby produced reaction mixture, said liquor being characterized by being 80–90 volume percent ethanol in water, and having sufficient HCl to make the acid content of the water portion thereof, 4–5N HCl.

* * * * *

UNITED STATES PATENT AND TRADEMARK OFFICE
CERTIFICATE OF CORRECTION

PATENT NO. : 5,314,670
DATED : May 24, 1994
INVENTOR(S) : Weimar W. White et al

It is certified that error appears in the above-indentified patent and that said Letters Patent is hereby corrected as shown below:

Column 8, Line 5, after "$(NH_4)_2RhCl_5(H_2O)$" delete "$(NH_4Cl)RhCl_4(H_2O_2$" and insert --$(NH_4)RhCl_4(H_2O)_2$--.

Signed and Sealed this

Fifteenth Day of November, 1994

Attest:

BRUCE LEHMAN

*Attesting Officer*     *Commissioner of Patents and Trademarks*